(12) United States Patent
Adra (10) Patent No.: US 8,310,180 B2
(45) Date of Patent: Nov. 13, 2012

(54) ELECTRIC POWERTRAIN SYSTEM HAVING BIDIRECTIONAL DC GENERATOR

(75) Inventor: Rodwan Tarek Adra, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 115 days.

(21) Appl. No.: 12/885,981

(22) Filed: Sep. 20, 2010

(65) Prior Publication Data

US 2011/0024212 A1 Feb. 3, 2011

Related U.S. Application Data

(63) Continuation of application No. 11/791,000, filed on Apr. 30, 2007, now Pat. No. 7,812,555.

(51) Int. Cl.
*H02P 3/00* (2006.01)
(52) U.S. Cl. .......................... 318/375; 318/376; 318/800
(58) Field of Classification Search .................. 318/375, 318/376, 400.01, 722, 757, 799, 800, 801; 180/65.21, 165
See application file for complete search history.

(56) References Cited

U.S. PATENT DOCUMENTS

| 7,034,480 | B2 * | 4/2006 | Kumar et al. ................. 318/362 |
| 7,137,344 | B2 * | 11/2006 | Kumar et al. .................... 105/35 |
| 7,309,929 | B2 * | 12/2007 | Donnelly et al. ............. 290/4 R |
| 2008/0121136 | A1 * | 5/2008 | Mari et al. ....................... 105/35 |

* cited by examiner

*Primary Examiner* — Bentsu Ro
*Assistant Examiner* — Antony M Paul
(74) *Attorney, Agent, or Firm* — Miller, Matthias & Hull (57) ABSTRACT

An electric powertrain for use with an engine and a traction device is disclosed. The electric powertrain has a DC motor/generator operable to receive at least a portion of a first mechanical output from the engine and produce a DC power output. The DC motor/generator is also operable to receive DC power and produce a second mechanical output. The electric powertrain further has a drivetrain operable to receive the DC power output and use the DC power output to drive the traction device. The drivetrain is also operable to generate DC power when the traction device is operated in a dynamic braking mode.

18 Claims, 2 Drawing Sheets

ELECTRIC POWERTRAIN SYSTEM HAVING BIDIRECTIONAL DC GENERATOR

CROSS-REFERENCE TO RELATED APPLICATION

The present application is a continuation of U.S. patent application Ser. No. 11/791,000 filed on Apr. 30, 2007, the disclosure of which is herein incorporated by reference in its entirety.

TECHNICAL FIELD

The present disclosure is directed generally to an electric powertrain system and, more particularly, to an electric powertrain system having a bidirectional DC generator.

BACKGROUND

Internal combustion engines such as gasoline engines, diesel engines, and gaseous fuel-powered engines exhaust a complex mixture of air pollutants. Due to increased attention on the environment, exhaust emission standards have become more stringent and the amount of pollutants emitted to the atmosphere from an engine is regulated depending on the type of engine, size of engine, and/or class of engine. In addition, fuel costs have risen significantly in recent years. As a result, efforts are being made to produce hybrid electric vehicles with electric powertrain systems that supplement internal combustion engines with electric power to reduce emissions and operating costs (i.e. fuel costs) associated with internal combustion engines.

A typical electric powertrain system for a hybrid electric vehicle includes an internal combustion engine and one or more electric traction motors operable to drive a traction device of the vehicle so that the vehicle can traverse a ground surface. The internal combustion engine generally produces a mechanical output (e.g. a rotation of a crankshaft), which is received by an AC alternator. The AC alternator is driven by the mechanical output of the engine to produce an alternating current ("AC") output, with a frequency dependent on the rotational speed of the crankshaft. A first set of power electronics (i.e. a rectifier) receives the AC output and converts it to a direct current ("DC") output. This DC output is then used to drive the traction motors in one of two ways. In a first example, the traction motors are DC traction motors that can be driven directly by the DC output of the first set of power electronics. In a second example, the traction motors are AC traction motors. In this case, the DC output is passed through a second set of power electronics (i.e. an inverter) that converts the DC output to an AC output with a desired frequency. This AC output is then used to drive the AC traction motors at a speed related to the frequency of the AC output. When the hybrid electric vehicle is operated in a dynamic braking mode (e.g. braking, decelerating, downshifting, etc.), the traction motors operate as generators driven by the traction devices themselves to produce current directed back towards the engine. This reverse current is shunted away from the powertrain to a grid of resistors that dissipate the current as heat energy.

Efforts are being made to make use of this dynamic braking mode current to supplement the electric powertrain system, rather than being dissipated and wasted. One possible use of the dynamic braking mode current was disclosed in U.S. Pat. No. 5,351,775 ("the '775 patent") by Johnston et al. on Oct. 4, 1994. Specifically, the '775 patent disclosed an electric powertrain system having bidirectional thyristor-type converters controlled to allow the dynamic braking mode current to flow back to an engine. More specifically, the engine is connected to drive an AC generator to produce an AC output current that is passed through an AC power grid to a field converter and two armature converters. The converters translate the AC output to a DC output used to drive two DC traction motors. Additionally, the electric powertrain of the '775 patent provides a connection to a DC trolley line so that DC power from the trolley line can be used to supplement the powertrain system. More specifically, the DC power from the trolley line is converted to AC power by a bidirectional trolley/retard converter, which is then fed directly to the AC power grid. The connection to the DC trolley line also includes a set of retarding resistors.

When the electric powertrain system of the '775 patent is operated in a retarding mode, the DC traction motors act as generators sending DC power through the bidirectional field converter and armature converters. In this direction, the bidirectional converters are operable to convert the DC power to AC power. This converted AC power is delivered through the AC power grid to drive the AC generator to act as a motor driving the engine. In this manner, the fuel consumption of the engine is reduced. Additional AC power is delivered to the bidirectional trolley/retard converter for conversion back to DC power and dissipation as heat by the retarding resistors.

While the electric powertrain system of the '775 patent may make use of the energy produced by traction motors in a dynamic braking mode, it may be expensive. That is, because the engine is coupled with an AC alternator, the field converter, armature converters, and trolley/retard converter must each be capable of converting DC power to AC power in one direction and AC power to DC power in a second direction. The amount and types of electronic components necessary to manufacture these bidirectional converter circuits may make them prohibitively expensive.

Further, because the electric powertrain system of the '775 patent uses an AC generator to convert the mechanical power output of the engine to electrical power, it may inefficiently utilize under-hood space. More specifically, AC generators are generally larger than their DC counterparts. That is, an AC generator rated to convert a certain amount of horsepower to electrical power may be larger than a DC generator rated to convert the same amount of horsepower to electrical power. Further, AC generators rated to convert lower frequencies of mechanical rotation to electrical power are generally larger than AC generators rated to convert higher frequencies of mechanical rotation. That is, in order for the AC generator of the '775 patent to make efficient use of all frequencies of mechanical rotation outputted by the engine, the AC generator's size must be larger than an AC generator rated only for higher frequencies. Thus, the AC generator of the '775 patent may take up a relatively large amount of space in an associated vehicle.

The disclosed electric powertrain system is directed to overcoming one or more of the problems set forth above.

SUMMARY OF THE INVENTION

In one aspect, the present disclosure is directed to an electric powertrain for use with an engine and a traction device. The electric powertrain includes a DC motor/generator operable to receive at least a portion of a first mechanical output from the engine and produce a DC power output. The DC motor/generator is also operable to receive DC power and produce a second mechanical output. The electric powertrain further includes a drivetrain operable to receive the DC power output and use the DC power output to drive the traction device. The drivetrain is also operable to generate DC power when the traction device is operated in a dynamic braking mode.

In another aspect, the present disclosure is directed to a method of operating a machine. The method includes combusting fuel to generate a first mechanical power output, and converting the first mechanical power output to a first DC power output. The method also includes using the first DC power output to propel the machine, and converting a motion of the machine to a second DC power output. The method further includes converting the second DC power output to a second mechanical power output. The second mechanical power output minimizes an amount of fuel combusted.

DETAILED DESCRIPTION

Figure 1:
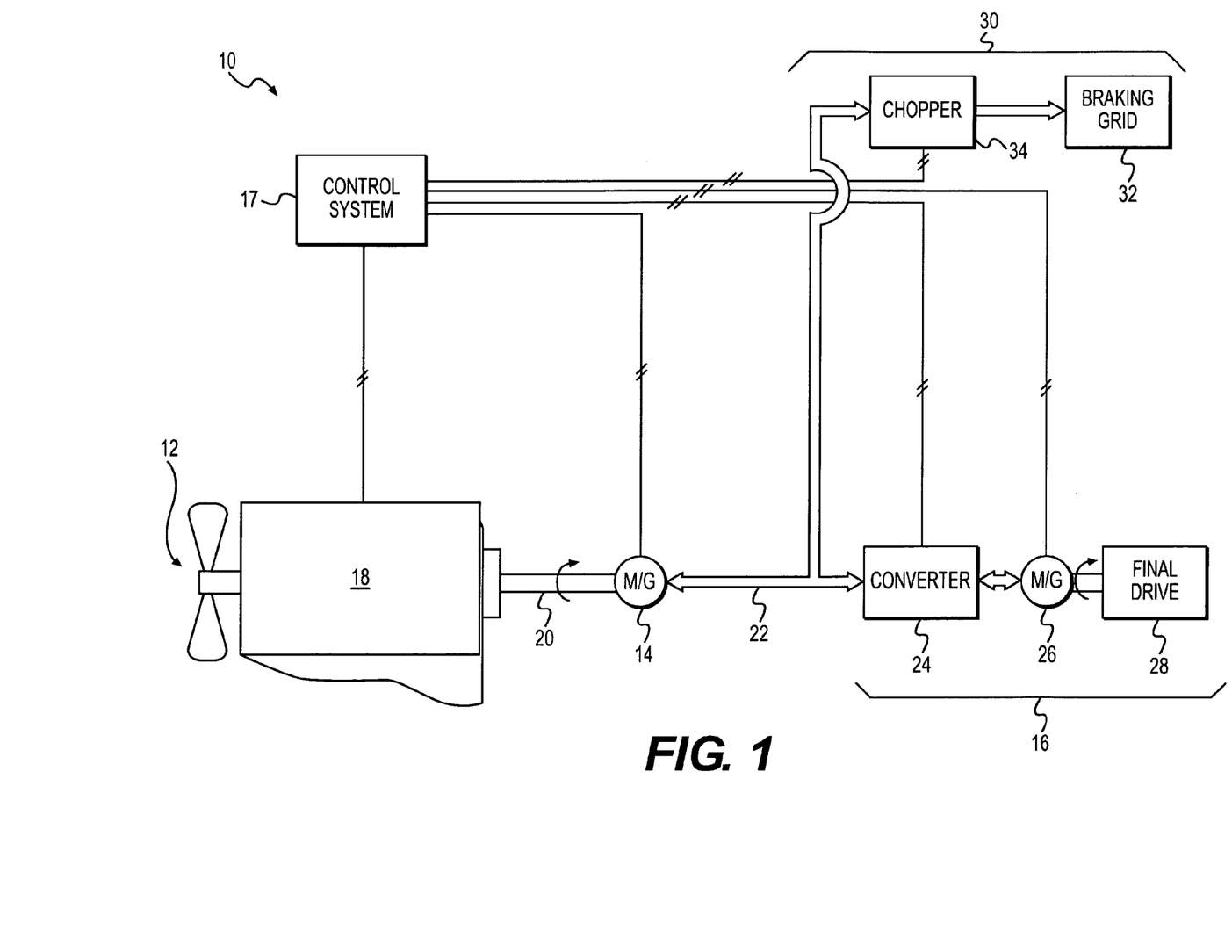
FIG. 1 is a schematic illustration of an exemplary disclosed electric powertrain.

FIG. 1 illustrates an electric powertrain 10 generally having a power source 12, a DC motor/generator 14, a drivetrain 16, a power dissipation circuit 30, and a control system 17. Powertrain 10 may generally be configured to transfer power in two directions. More specifically, powertrain 10 may be configured to transfer power in a forward direction from power source 12 to drivetrain 16, and in a reverse direction from drivetrain 16 to power source 12.

Power source 12 may be an internal combustion engine such as, for example, a diesel engine, a gasoline engine, a gaseous fuel-powered engine, or any other engine suitable for driving powertrain 10. Power source 12 may also be a non-combustion source of power such as, for example, a fuel cell, a power storage device, or any other source of power known in the art. Power source 12 may generate a mechanical power output. For example, power source 12 may include an engine block 18 and a crankshaft 20 rotatably disposed within engine block 18. Power source 12 may combust a mixture of fuel and air to generate the mechanical power output, which may be embodied by a rotation of crankshaft 20. As such, it is contemplated that power source 12 may include a plurality of other components such as, for example, an intake manifold, an exhaust manifold, and a plurality of fuel injectors. It should be appreciated that power source 12 may be rated to generate a maximum amount of mechanical power (i.e. horsepower) at a corresponding speed (i.e. revolutions per minute, "rpm"). For example, power source 12 may be rated to generate a maximum of about 2000 horsepower at about 500 rpm. It should also be appreciated that an amount of fuel combusted by power source 12 may correspond to a rotational speed and torque (i.e. power) of crankshaft 20. Further, it should be noted that crankshaft 20 may also be driven by DC motor/generator 14 in a dynamic braking or reverse mode, thus reducing the amount of fuel needed to maintain operation of power source 12, and that power source 12 may be rated to operate at a certain speed corresponding to an amount of accepted mechanical power. For example, power source 12 may be rated to operate at about 500 rpm when driven by about 600 horsepower from DC motor/generator 14 (i.e. about 30% of the mechanical power generated by power source 12 when fueled to operate at the same speed).

DC motor/generator 14 may be mechanically coupled to crankshaft 20 to transfer mechanical power to and from power source 12. More specifically, DC motor/generator 14 may embody any DC generator capable of acting as a motor when supplied with DC power, and as a generator to produce DC electrical power when mechanically driven. For example, DC motor/generator 14 may embody a brushed DC motor, a DC engine-generator, or any other device capable of both converting received mechanical power to DC power, and converting received DC power to mechanical power. More specifically, DC motor/generator 14 may be controlled to toggle between acting as a generator and acting as a motor by changing an operational parameter, such as, for example, modulating a magnetic field, modulating a field current, and/or manually or automatically manipulating a switch-controlled electrical connection. Further, DC motor/generator 14 may be rated to accept and generate a maximum amount of mechanical power (i.e. horsepower), and further rated to accept and generate a maximum amount of electrical power (i.e. watts). It is contemplated that DC motor/generator 14 may have other ratings such as, for example, a maximum input voltage or current, or a maximum output voltage. The ratings of DC motor/generator 14 may be positively correlated to a size of DC motor/generator 14. For example, a larger DC motor/generator 14 may be rated to accept more horsepower than a smaller DC motor/generator 14. Thus, the size of DC motor/generator 14 may be chosen such that DC motor/generator 14 may be rated to accept the maximum mechanical power output of power source 14. Alternatively or additionally, some characteristics of DC motor/generator 14 may be controllably set during operation of DC motor/generator 14, such as, for example, an output voltage level.

DC motor/generator 14 may be operable in a forward mode and in a dynamic braking or reverse mode. When operating in the forward mode, DC motor/generator 14 may accept mechanical power (i.e. the rotation of crankshaft 20), and use it to generate a DC power output as is known in the art. An amount of the generated DC power may be positively correlated to the amount of received horsepower (i.e. the rotational speed and torque of crankshaft 20). When operating in the dynamic braking mode, DC motor/generator 14 may accept DC power, and use it to generate a mechanical power output (i.e. by driving crankshaft 20 to rotate). Similarly, an amount of horsepower delivered by DC motor/generator to power source 12 may be positively correlated to the amount of DC power received.

DC motor/generator 14 may be coupled to deliver DC power to and receive DC power from a DC power bus 22. DC power bus 22 may embody an array of one or more wires operable to carry a DC power signal. It is contemplated that the wires of DC power bus 22 may carry DC power signals of various voltages and/or currents, if desired, and may include, among other signals, a ground signal. Although not shown, it should be appreciated that DC power bus 22 may additionally be connected to power a variety of auxiliary devices and/or systems of an associated machine, such as, for example, lighting systems, heating systems, batteries, or any other device and/or system included in an associated machine. It is contemplated that the DC power in DC power bus 22 may be supplemented or completely supplied by an external or off-board DC power source such as, for example, overhead DC trolley lines. It should be appreciated that such trolley lines may provide powertrain 10 with a surplus of power.

When DC power bus 22 is connected to trolley lines, powertrain 10 may be operable in a trolley mode. When operating in the trolley mode, DC motor/generator 14 may by controllably set to act as a generator (e.g. by modulating the field current of DC motor/generator 14). More specifically, a first portion of the DC power in DC power bus 22 may drive DC motor/generator 14 to produce a mechanical power output.

For example, the mechanical power output of DC motor/generator 14 may embody a rotation of crankshaft 20. Further, a second portion of the DC power in DC power bus 22 may power drivetrain 16.

Drivetrain 16 may be connected to receive power from and deliver power to DC power bus 22 to power a traction device of the associated machine. More specifically, drivetrain 16 may include a converter 24, a traction motor 26, and a final drive 28.

Converter 24 may generally embody a set of power electronics operable to convert DC power to AC power (e.g. operable as an inverter) in a forward mode, and operable to convert AC power to DC power (e.g. operable as a rectifier) in a dynamic braking mode. More specifically, converter 24 may be connected to receive power from and deliver power to DC power bus 22, and may embody any power electronics capable of operating as both an inverter and a rectifier. For example, converter 24 may include any number of thyristors, insulated gate bipolar transistors (IGBTs), MOSFETs, bipolar junction transistors (BJTs), resistors, capacitors, inductors, diodes, etc., configured to operate according to the present disclosure. It should be appreciated that many such circuits are known in the art, including, but not limited to, switched-mode power supplies, diode bridge full-wave rectifiers, H-bridge inverters, etc. In one exemplary embodiment, converter 24 may embody a three-phase converter with controllable frequency and/or voltage parameters such that a frequency and/or voltage of the AC power generated or received by converter 24 may be controllably set, as is known in the art. When operating in the forward mode, converter 24 may receive DC power from DC power bus 22, operate as an inverter to convert the DC power to AC power, and deliver the AC power to traction motor 26. When operating in the dynamic braking mode, converter 24 may receive AC power from traction motor 26, operate as a rectifier to convert the AC power to DC power, and deliver the DC power to DC power bus 22. Converter 24 may include solid state electronics such the operating mode of converter 24 may be determined by a direction of the electrical power flow across converter 24. For example, converter 24 may operate in the forward mode when a DC power is applied to DC terminals of converter 24, and in the dynamic braking mode when an AC power is applied to AC terminals of converter 24. It is contemplated that converter 24 may alternatively be toggled between the forward mode and the dynamic braking mode by any means known in the art. For example, converter 24 may be controllably toggled between the forward mode and the dynamic braking mode by manually or automatically manipulating one or more electrical switches. It should be appreciated that converter 24 may be connected to traction motor 26 by a dedicated or shared AC power bus similar to DC power bus 22.

Traction motor 26 may be generally operable to receive AC power from converter 24 and use it to produce a mechanical power output (e.g. operable as an AC motor) in a forward mode, and operable to receive mechanical power and use it to generate variable frequency, variable voltage AC power (e.g. operable as an AC generator) in a dynamic braking mode. It should be appreciated that the frequency and/or voltage of the generated AC power may be controllably set by the frequency and/or voltage operational parameters of converter 24, respectively, and may correspond to a speed of traction motor 26, as is known in the art. For example, traction motor 26 may embody an AC induction motor connected to receive three-phase AC power from converter 24. It is contemplated that traction motor 26 may alternatively embody an AC synchronous motor, or any other AC traction motor known in the art. As such, traction motor 26 may include any number of thyristors, insulated gate bipolar transistors (IGBTs), MOSFETs, bipolar junction transistors (BJTs), resistors, capacitors, inductors, diodes, etc., configured to operate according to the present disclosure. It should be noted that like DC motor/generator 14, traction motor 26 may be controlled to toggle between acting as a generator and acting as a motor by changing an operational parameter, such as, for example, modulating a slip frequency, and/or manually or automatically manipulating a switch-controlled electrical connection. In fact, it is contemplated that traction motor 26 may alternatively embody a DC traction motor, such as, for example, a switched reluctance traction motor, or a DC motor/generator similar in operation to DC motor/generator 14, if desired. It should be appreciated that, however, if traction motor 26 embodies a DC traction motor, converter 24 may alternatively embody a bidirectional DC-to-DC power converter, or may alternatively be omitted entirely such that traction motor 26 is connected directly to DC power bus 22.

Final drive 28 may generally operate in a forward mode to receive mechanical power to deliver torque to a traction device of the associated machine, such as, for example, a wheel. More specifically, final drive 28 may embody any number of rotatable shafts, axles, and/or gears mechanically coupled to be driven by the received mechanical power and operable to deliver torque to the associated traction device. For example, final drive 28 may receive the mechanical power output from traction motor 26, and use it to deliver torque to the associated traction device. As such, final drive 28 may include any number of other components such as, for example, a brake, a reduction gear train, a clutch, or any other final drive component known in the art. It should be appreciated that final drive 28 may additionally cooperate with traction motor 26 and converter 24 to operate in a dynamic braking mode. For example, an operator of the associated machine may brake to slow or stop the machine. In this case, the frequency parameter of converter 24 may be modulated to drive traction motor 26 as a generator, as described above. In this manner, the generating operation of traction motor 26 may act to slow the associated machine, as is known in the art.

It is contemplated that drivetrain 16 may alternatively embody a plurality of converters 24, traction motors 26, and final drives 28, if desired. For example, drivetrain 16 may include one converter 24, one traction motor 26, and one final drive 28 each associated with one of a plurality of wheels. Because each converter 24, traction motor 26, and final drive 28 may operate substantially similarly, only one is described herein.

In addition to electrically connecting drivetrain 16 to DC motor/generator 14, DC power bus 22 may also be electrically connected to power dissipation circuit 30. That is, DC power bus 22 may deliver DC power to power dissipation circuit 30. Power dissipation circuit 30 may generally serve to remove excess DC power from DC power bus 22. For example, if the amount of DC power delivered by DC power bus 22 to DC motor/generator 14 exceeds the maximum amount of DC power for which DC motor/generator 14 is rated, a portion of the DC power may be delivered to power dissipation circuit 30 so that the remaining DC power in DC power bus 22 is in compliance with the rating of DC motor/generator 14. As such, power dissipation circuit 30 may include a braking grid 32 connected to DC power bus 22 via a chopper 34. Braking grid 32 may generally embody one or more resistive components such as, for example, resistors or power resistors. Braking grid 32 may receive DC power from DC power bus 22 via chopper 34 and dissipate the DC power as heat. Although not shown, it is contemplated that braking grid 32 may include an associated fan to cool braking grid 32 as the DC power is dissipated. Chopper 34 may generally serve to regulate the amount of DC power that is dissipated by braking grid 32. For example, chopper 34 may be controlled to draw current from DC power bus 22 when the amount of DC power in DC power bus 22 exceeds a certain amount (e.g. the rated maximum of DC motor/generator 14). As such, chopper 34 may embody an electrical circuit including any number of thyristors, insulated gate bipolar transistors (IGBTs), MOSFETs, bipolar junction transistors (BJTs), resistors, capacitors, inductors, diodes, etc., configured to operate according to the present disclosure.

One or more of the components of powertrain 10 may be communicatively coupled with control system 17. For example, as shown in FIG. 1, control system 17 may be communicatively coupled with power source 12, DC motor/generator 14, converter 24, traction motor 26, and chopper 34 to receive feedback signals therefrom and/or control operation thereof. As such, control system may include a single microprocessor or multiple microprocessors that have a means for communicating signals to and from the components of powertrain 10. For example, control system 17 may include a memory, a secondary storage device, and a processor, such as a central processing unit or any other means for communicating signals to and from the components of powertrain 10. Numerous commercially available microprocessors can be configured to perform the functions of control system 17. It should be appreciated that control system 17 could readily embody a general power source microprocessor capable of controlling numerous power source functions. Various other known circuits may be associated with control system 17, including power supply circuitry, signal-conditioning circuitry, solenoid driver circuitry, communication circuitry, and other appropriate circuitry. It should also be appreciated that control system 17 may include one or more of an application-specific integrated circuit (ASIC), a field-programmable gate array (FPGA), a computer system, and a logic circuit, configured to allow control system 17 to function in accordance with the present disclosure. Thus, the memory of control system 17 may embody, for example, the flash memory of an ASIC, flip-flops in an FPGA, the random access memory of a computer system, or a memory circuit contained in a logic circuit. Control system 17 may be further communicatively coupled with an external computer system, instead of or in addition to including a computer system. It is contemplated that control system 17 may alternatively embody several electronic control systems such as, for example, a drive control system, an engine control module, a DC motor/generator field controller, and a traction motor inverter controller.

Control system 17 may receive feedback signals from the components of powertrain 10, commands from an operator of the associated machine, and deliver control commands to the components of powertrain 10. For example, control system 17 may receive a braking command from the operator, evaluate the braking command, and deliver control commands to the components of powertrain 10 to initiate a dynamic braking mode. In one example, control system 17 may initiate dynamic braking mode by modulating the field current of DC motor/generator 14, and modulating the frequency parameter of converter 24, causing DC motor/generator 14 and traction motor 26 to act as a motor and a generator, respectively, as discussed above. It is contemplated that control system may similarly detect whether DC power bus 22 is receiving DC power from an off-board DC power source (e.g. a trolley line), and deliver control commands to the components of powertrain 10 to initiate a trolley mode, if desired. Further, control system 17 may control an amount, timing, and/or pressure of the fuel supplied to power source 12 for combustion in order to control a speed and/or mechanical power output of power source 12. Control system 17 may also receive signals such as speed and temperature signals from DC motor/generator 14 and traction motor 26, rpm speed signals from power source 12, or any other signals needed to assist control system 17 in controlling powertrain 10.

Figure 2:
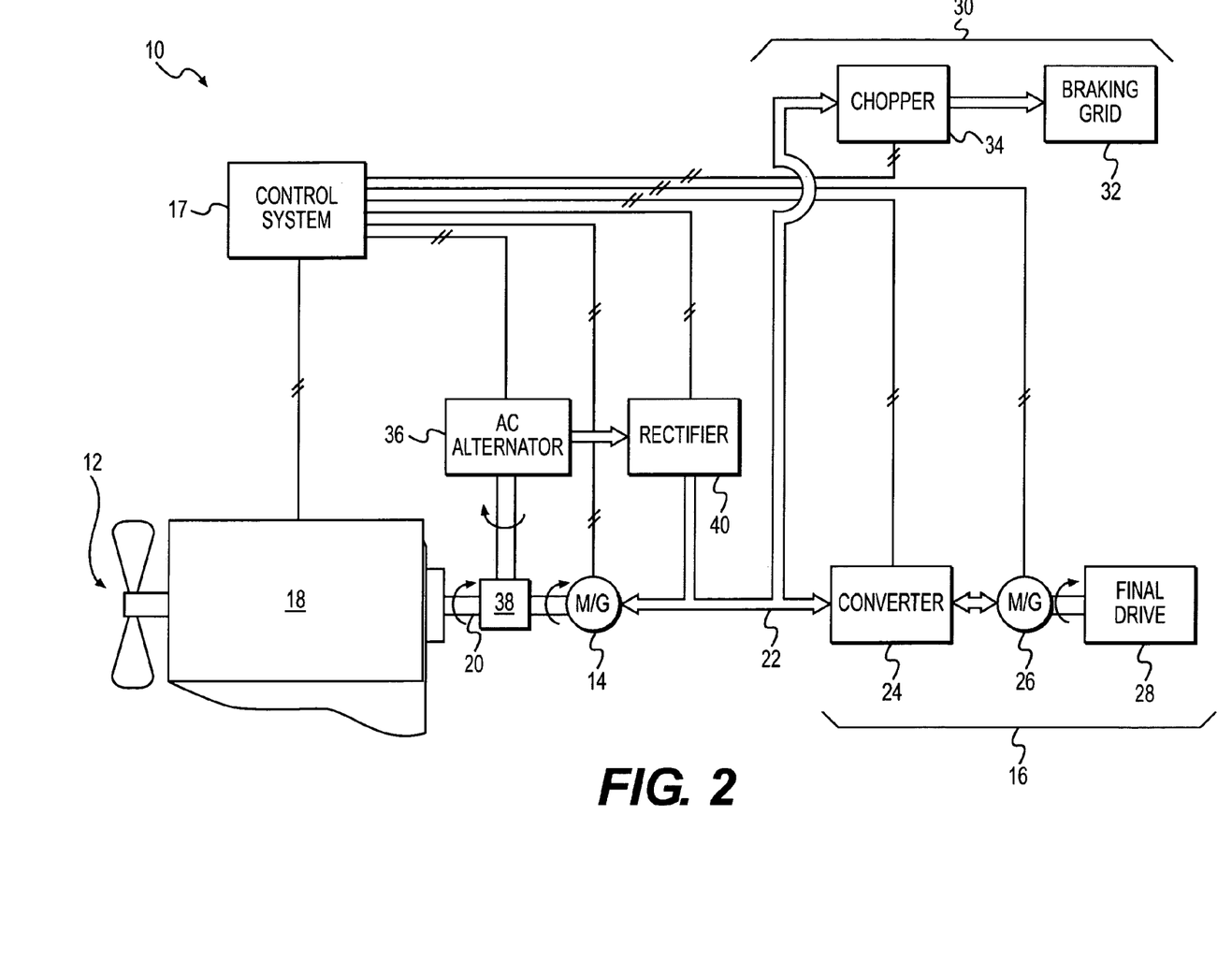
FIG. 2 is a schematic illustration of another exemplary disclosed electric powertrain.

FIG. 2 illustrates an alternative embodiment of powertrain 10. The alternative embodiment of FIG. 2 further includes an AC alternator 36 connected in parallel with DC motor/generator 14 through a differential 38 and a rectifier 40. AC alternator 36 may generally receive mechanical power and use it to generate AC power. As such, AC alternator 36 may readily embody any AC alternator known in the art, such as, for example, a three-phase AC synchronous alternator. AC alternator 36 may receive mechanical power from differential 38, and deliver AC power to rectifier 40. It is contemplated that a size of AC alternator 36 may be chosen based on a maximum amount of mechanical power it may receive from differential 38, and/or a range of frequencies at which that power may be received. It is also contemplated that AC alternator 36 may be communicatively coupled with control system 17, if desired.

Differential 38 may embody any mechanical device capable of receiving mechanical power, and dividing this mechanical power into two independent mechanical power outputs. That is, differential 38 may receive mechanical power from crankshaft 20, and deliver a first mechanical power output to AC alternator 36, and a second mechanical power output to DC motor/generator 14. It should be noted that such mechanical devices are well known in the art, and that an amount of the first mechanical power output may be different than an amount of the second mechanical power output. That is, differential 38 may drive AC alternator 36 and DC motor/generator 14 at different speeds with different torque inputs. For example, differential 38 may include a plurality of gears drivably connected to a first rotatable shaft to deliver the first mechanical power output and a second rotatable shaft to deliver the second mechanical power output. The gears may be connected at predetermined ratios such that the first mechanical power output corresponds to a predetermined proportion of the total mechanical power from crankshaft 20 and the second mechanical power output corresponds to the remaining portion. Further, the gear ratios may be chosen based on desired relative rotational speeds of the rotatable shafts. For example, the gear ratios may be chosen to provide higher rotational speeds to AC alternator 36 (i.e. higher frequencies of mechanical power), and lower rotational speeds to DC motor/generator 14. It should also be noted that when DC motor/generator 14 operates in dynamic braking mode, the mechanical power it outputs may be delivered to power source 12 via differential 38.

Rectifier 40 may embody any electronic circuit known in the art operable to convert AC power to DC power. In one exemplary embodiment, rectifier 40 may embody a three-phase, full-wave bridge rectifier. However, it is contemplated that rectifier 40 may alternatively embody any other unidirectional rectifier circuit such as, for example, a synchronous rectifier. It is contemplated that rectifier 40 may additionally include smoothing circuitry such as, for example, a smoothing capacitor, if desired. When powertrain 10 is operated in the forward mode, rectifier 40 may receive the AC power output of AC alternator 36, convert it to DC power, and output the DC power to DC power bus 22. More specifically, rectifier 40 may produce DC power at a voltage substantially equal to the set output voltage of DC motor/generator 14 such that the DC currents from rectifier 40 and DC motor/generator 14 may be additively delivered along DC power bus 22. It should be appreciated that some characteristics of rectifier 40 may be controllably set during operation of rectifier 40, such as, for example, an output voltage level. When powertrain 10 is operated in the dynamic breaking mode, however, rectifier 40 may block DC power (i.e. current) from passing from DC power bus 22 back to AC alternator 36. For example, rectifier 40 may be communicatively coupled with control system 17. Control system 17 may be configured to reverse bias the diodes in rectifier 40 (e.g. by applying a voltage between AC alternator 36 and rectifier 40) when powertrain 10 is operating in a dynamic braking mode to keep current from saturating the diodes and passing from DC power bus 22 to AC alternator 36. A more complete description of an exemplary operation of the disclosed powertrain system is provided below.

INDUSTRIAL APPLICABILITY

The system of the present disclosure may provide an electric powertrain system capable of utilizing power generated by dynamic braking and/or an external or off-board source (e.g. trolley lines) to minimize an amount of fuel consumed by the electric powertrain system during a dynamic braking mode operation. Further, the electric powertrain system of the present disclosure may minimize a cost of required power electronics while also minimizing an amount of under-hood space consumed by the electric powertrain system, thus making the electric powertrain system applicable to vehicles with limited under-hood space. In fact, the electric powertrain system of the present disclosure may be applicable to any hybrid electric vehicle that utilizes a dynamic braking mode. The operation of powertrain 10 will now be explained.

During forward mode operation of powertrain 10, power may generally be transferred from power source 12 to drive final drive 28. Referring to FIG. 1, power source 12 may combust a mixture of fuel and air to drive crankshaft 20 to rotate. The rotation of crankshaft 20 may mechanically drive DC motor/generator 14 to act as a DC generator. That is, DC motor/generator 14 may be controllably set to act as a DC generator (i.e. by control system 17), with mechanical power provided by the rotation of crankshaft 20. Thus, DC motor/generator 14 may generate a DC output signal, and deliver this signal to DC power bus 22. It should be appreciated that a voltage level of the DC output from DC motor/generator may be controllably set by control system 17. The DC output from DC motor/generator 14 may be passed by DC power bus 22 to converter 24. It should be noted that none of the DC output from DC motor/generator 14 may be delivered through chopper 34 because the amount of power of the DC output may be less than the minimum power accepted by chopper 34.

Converter 24 may be controllably set to act as an inverter (i.e. by control system 17). That is, converter 24 may convert the DC output to an AC output signal with a frequency and/or voltage corresponding to a desired speed of traction motor 26, as discussed above. This AC output signal may then power traction motor 26 to propel the machine. More specifically, traction motor 26 may be controllably set to act as an AC motor (i.e. by control system 17). Thus, the AC output signal may power traction motor 26 to produce a mechanical output that drives final drive 28.

Powertrain 10 may also be operated in the dynamic braking mode. For example, an operator of the machine may signal that a dynamic braking mode should begin by depressing a deceleration or brake pedal. This braking instruction may be delivered to control system 17, thus beginning the dynamic braking operation. In response thereto, control system 17 may reverse the operation of traction motor 26 (e.g. by modulating the frequency parameter of converter 24), so traction motor 26 may operate as an AC generator. Control system 17 may also reverse the operation of DC motor/generator 14 (e.g. by modulating the field current of DC motor/generator 14), so DC motor/generator 14 may operate as a DC motor.

During dynamic braking mode operation, the movement of the machine's traction devices may drive final drive 28 to produce a mechanical power output. Final drive 28 may correspondingly drive traction motor 17 to operate as an AC generator. Thus, traction motor 17 may produce an AC power output, with a frequency determined by the frequency parameter of converter 24. This AC power output may then be delivered to converter 24.

Because converter 24 may be operable as a rectifier during dynamic mode operation, converter 24 may convert the AC power output to a DC power output. This DC power output may be delivered to power DC motor/generator 14 via DC power bus 22. Because it may be operable as a motor, DC motor/generator 14 may use the received DC power to deliver mechanical power to power source 12. More specifically, DC motor/generator 14 may produce a mechanical power output embodied by a rotation of crankshaft 20.

A driven rotation of crankshaft 20 may supplement or replace power produced by power source 12. That is, while operating in a dynamic braking mode, the amount of fuel combusted by power source 12 can be reduced or eliminated without negatively affecting operation of power source 12. More specifically, control system 17 may sense the amount of mechanical power being delivered by DC motor/generator 14 (e.g. by sensing the speed of power source 12), and reduce the amount of fuel being delivered to power source 12 accordingly. For example, as discussed above, power source 12 may be rated to operate at about 500 rpm when driven by a mechanical power of 600 horsepower from crankshaft 20. Thus, if it is desired that power source 12 operate at 600 horsepower, and crankshaft 20 is delivering 300 horsepower, control system 17 may limit the amount of fuel delivered to power source 12 to an amount needed to produce only 300 horsepower. Similarly, if crankshaft 20 is delivering 600 horsepower, control system 17 may substantially stop fueling of power source 12.

It should be appreciated that, while operating in dynamic braking mode, a portion of the DC power in DC power bus 22 may be dissipated through chopper 34 and braking grid 32. More specifically, if the amount of DC power in DC power bus 22 exceeds a predetermined amount (e.g. the amount of power required to drive DC motor/generator 14 to produce 600 horsepower), the excess power may be passed through chopper 34 for dissipation as heat within braking grid 32. The power allowed through chopper 34 may be removed from DC power bus 22 by dividing the current delivered by converter 24 into two portions: one portion to chopper 34, and the remaining portion to DC motor/generator 14.

Powertrain 10 may also operate in a trolley mode. During trolley mode operation, some of the components of powertrain 10 may operate substantially similar to their operation in forward mode, and the others may operate substantially similar to their dynamic braking mode operation. More specifically, when control system 17 senses that trolley operation has begun (i.e. control system 17 senses a connection with the trolley power grid), it may set DC motor/generator 14 to dynamic braking mode so that the DC power received from the trolley power grid may be directed to drive crankshaft 20 and reduce the fueling amount of power source 12, as discussed above. Control system 17 may further set converter 24 and traction motor 26 to forward mode operation, so that the DC power received from the trolley power grid may also be directed to drive final drive 28, as discussed above. It should be noted that excess power in DC power bus 22 may be dissipated by braking grid 32, as discussed above.

Referring now to the embodiment illustrated in FIG. 2, much of the operation of powertrain 10 may remain substantially unchanged from the above-described operation. The inclusion of AC alternator 36, differential 38, and rectifier 40 may substantially affect only the operations of power source 12, DC motor/generator 14, and control system 17. Thus, for the sake of brevity, an exemplary operation of the embodiment illustrated in FIG. 2 is provided below without repetition of the unchanged operations.

When operating in the forward mode, the rotation of crankshaft 20 may deliver mechanical energy to differential 38. Differential 38 may split the received mechanical power into two portions, as discussed above. More specifically, the gears of differential 38 may be driven to rotate by the rotation of crankshaft 20, thus dividing the mechanical power into a first portion embodied as a rotation of the first rotatable shaft of differential 38, and a second portion embodied as a rotation of the second rotatable shaft of differential 38. As also discussed above, the first rotatable shaft may rotate at a faster rate than the second rotatable shaft.

The first rotatable shaft may deliver the first portion of the mechanical power to drive AC alternator 36. That is, AC alternator 36 may produce AC power at a frequency related to the rotational rate of the first rotatable shaft. This AC power may be rectified into DC power by rectifier 40. Similarly, the second rotatable shaft may deliver the second portion of the mechanical power to drive DC motor/generator 14 in the manner disclosed above to produce a DC power signal. The DC power signals generated by rectifier 40 and DC motor/generator 14 may have substantially the same voltage. The two DC power signals may be combined (i.e. their currents summed), and passed to DC power bus 22 in to power drivetrain 16 in the manner discussed above.

When operating in dynamic braking mode, control system 17 may reverse bias the diodes of rectifier 40 to prevent current from passing from DC power bus 22 to AC alternator 36, thus substantially removing both rectifier 40 and AC alternator 36 from powertrain 10. For example, control system 17 may apply a voltage substantially close to, but less than, the voltage of DC power bus 22 in between rectifier 40 and AC alternator 36. In a more specific example, if the voltage of DC power bus 22 is 100 VDC, control system 17 may apply a voltage of about 98.4 VDC between rectifier 40 and AC alternator, thus keeping the diodes of rectifier 40 reverse-biased, as is known in the art. DC motor/generator 14 may act as a motor, as disclosed above, with its mechanical power output being transferred to crankshaft 20 via differential 38.

Similarly, when operating in trolley mode, control system 17 may reverse bias the diodes of rectifier 40 to prevent current from passing from DC power bus 22 to AC alternator 36, thus substantially removing both rectifier 40 and AC alternator 36 from powertrain 10, as disclosed above. In this case, DC motor/generator 14 may also act as a motor with its mechanical power output being transferred to crankshaft 20 via differential 38.

The disclosed electric powertrain system may provide a low cost electric powertrain system. More specifically, the disclosed electric powertrain system may require a relatively inexpensive power converter for an AC alternator, or may omit the power converter entirely (i.e. if the AC alternator is omitted). Although the embodiment illustrated in FIG. 2 may include an AC alternator, the power electronics associated with the AC alternator may embody an inexpensive unidirectional rectifier.

Further, the disclosed electric powertrain system may minimize the amount of under-hood space consumed thereby. That is, because the disclosed system may utilize a DC motor/generator, under-hood space may be conserved. Further, with reference to the embodiment of FIG. 2, the DC motor/generator and AC alternator may be optimally sized to minimize under-hood space. For example, the power source of the present disclosure may be rated to produce a maximum of 2000 horsepower, and to receive a maximum of 600 horsepower. Because the AC alternator may be unidirectional (i.e. not used to return power to the power source), the DC motor/generator may be sized to support 600 horsepower and the AC alternator may be sized to support the remaining 1400 horsepower. Further, because the AC alternator may be powered by a rotatable shaft with a relatively high frequency of movement (i.e. by appropriately choosing the gear ratios of the differential), the AC alternator may be further downsized without sacrificing power efficiency.

It will be apparent to those skilled in the art that various modifications and variations can be made to the electric powertrain system of the present disclosure without departing from the scope of the disclosure. Other embodiments will be apparent to those skilled in the art from consideration of the specification and practice of the electric powertrain system disclosed herein. It is intended that the specification and examples be considered as exemplary only, with a true scope of the disclosure being indicated by the following claims and their equivalents.

What is claimed is:

1. An electrical powertrain for use with an engine and a traction device, comprising;
   a DC motor/generator operable to:
   receive a first portion of a first mechanical output from the engine and produce a first DC power output for the traction device; and
   receive DC power from the traction device and produce a second mechanical output to drive the engine;
   an AC alternator operable to:
   receive a second portion of the first mechanical output from the engine and produce an AC power output; a rectifier coupled with the AC alternator, the rectifier operable to:
   convert the AC power output to a second DC power output combinable with the first DC power output of the DC motor/generator; and
   a drivetrain operable to:
   receive and use the first and second DC power output to drive the traction device in a forward mode; and
   generate DC power using a bidirectional power converter directed to the DC motor/generator to drive the engine when the traction device is operated in a dynamic braking mode.

2. The electric powertrain of claim 1, further including a braking grid operable to dissipate as heat a portion of the DC power generated by the drivetrain.

3. The electric powertrain of claim 2, further including a chopper operable to control an amount of DC power dissipated by the braking grid.

4. The electric powertrain of claim 1, wherein the drivetrain includes at least one DC traction motor operable to act as a DC motor and a DC generator.

5. The electric powertrain of claim 1, wherein the drivetrain includes at least one AC traction motor operable to act as an AC motor and an AC generator.

6. The electric powertrain of claim 1, further including a controller operable to: set the DC motor/generator to act as a DC motor; set the DC motor/generator to act as a DC generator; and block a current from flowing from the rectifier to the AC alternator.

7. The electric powertrain of claim 1, wherein the engine is rated to produce a first amount of mechanical power and to receive a second amount of mechanical power, the second amount of mechanical power being less than the first amount of mechanical power; the DC motor/generator is sized based on the second amount of mechanical power; and the AC alternator is sized based on a difference between the first and second amounts of mechanical power.

8. The electric powertrain of claim 7, wherein the AC alternator is further sized based on a frequency of the first portion of the first mechanical output delivered to the AC alternator.

9. The electric powertrain of claim 1, wherein: the engine is rated to produce a maximum amount of mechanical power; and the DC motor/generator is sized based on the maximum amount of mechanical power.

10. The electric powertrain of claim 1, wherein the drivetrain includes:
at least one AC traction motor operable to act as an AC motor and an AC generator; and
a bidirectional power converter coupled between the DC motor/generator and the at least one AC traction motor, the bidirectional power converter being operable to act as an inverter to receive the first and second DC power output from the DC motor/generator and the rectifier connecting the AC alternator, respectively, to drive the at least one AC traction motor in the forward mode, and operable as a rectifier to generate the DC power directed to the DC motor/generator to drive the engine when the at least one AC traction motor is operated in the dynamic braking mode.

11. The electric powertrain of claim 1, further including a connection to an off-board DC power source, the connection operable to receive DC power from the off-board DC power source to supplement the generated DC power.

12. The electric powertrain of claim 11, wherein the DC motor/generator is further operable to convert at least a portion of the DC power received from the off-board DC power source to at least a portion of the second mechanical output.

13. An electric powertrain for use with an engine and a traction device, comprising:
a differential configured to receive a first mechanical output from the engine and split the mechanical output into a first portion and a second portion;
a DC motor/generator configured to receive the first portion of the first mechanical output and produce a first DC power output for the traction device, and to receive DC power from the traction device and produce a second mechanical output to drive the engine via the differential;
an AC alternator operable to receive the second portion of the first mechanical output and produce an AC power output;
a rectifier coupled with the AC alternator, the rectifier operable to convert the AC power output to a second DC power output combinable with the first DC power output of the DC motor/generator;
at least one AC traction motor operable to act as an AC motor and an AC generator;
and a bidirectional power converter coupled between the DC motor/generator and the at least one AC traction motor, the bidirectional power converter being operable to act as an inverter to receive the first and second DC power output from the DC motor/generator and the rectifier connecting the AC alternator, respectively, to drive the at least one AC traction motor in the forward mode, and operable as a rectifier to generate the DC power directed to the DC motor/generator to drive the engine when the at least one AC traction motor is operated in the dynamic braking mode.

14. The electric powertrain of claim 13, further including a braking grid operable to dissipate as heat a portion of the DC power generated by the bidirectional power converter.

15. The electric powertrain of claim 14, further including a chopper operable to control an amount of DC power dissipated by the braking grid.

16. The electric powertrain of claim 13, further including a connection to an off-board DC power source, the connection operable to receive DC power from the off-board DC power source to supplement the generated DC power.

17. An electric powertrain for use with an engine and a traction device, comprising:
a differential having a first rotatable shaft and a second rotatable shaft configured to produce first and second portions of a first mechanical output received from the engine, the first rotatable shaft rotating at a faster rate than the second rotatable shaft;
a motor/generator configured to:
receive the first portion of a the first mechanical output from the engine and produce a first power output for the traction device; and
receive power from the traction device and produce a second mechanical output to drive the engine;
an AC alternator operable to receive the second portion of the first mechanical output and produce an AC power output at a frequency related to the rotational rate of the first rotational shaft of the differential;
a rectifier coupled with the AC alternator, the rectifier operable to convert the AC power output to a second DC power output combinable with the first DC power output of the DC motor/generator;
a drivetrain configured to:
receive and use the first and second power output to drive the traction device in a forward mode; and
generate power directed to the motor/generator to drive the engine when the traction device is operated in a dynamic braking mode.

18. The electric powertrain of claim 17, wherein the engine is rated to produce a first amount of mechanical power and to receive a second amount of mechanical power, the second amount of mechanical power being less than the first amount of mechanical power; the motor/generator has a capacity corresponding to the second amount of mechanical power; and the alternator has a capacity corresponding to a difference between the first and second amount of mechanical power.

* * * * *

UNITED STATES PATENT AND TRADEMARK OFFICE
CERTIFICATE OF CORRECTION

| | | |
|---|---|---|
| PATENT NO. | : 8,310,180 B2 | |
| APPLICATION NO. | : 12/885981 | |
| DATED | : November 13, 2012 | |
| INVENTOR(S) | : Rodwan Tarek Adra | |

It is certified that error appears in the above-identified patent and that said Letters Patent is hereby corrected as shown below:

In the Claims

Column 12, line 35, in Claim 1, delete "comprising;" and insert -- comprising: --.

Column 14, lines 32-33, in Claim 17, delete "of a the first mechanical output from the engine and produce" and insert -- of the first mechanical output and produce --.

Signed and Sealed this
Eleventh Day of August, 2015

Michelle K. Lee
*Director of the United States Patent and Trademark Office*